US010371117B2

(12) United States Patent
Kyouda et al.

(10) Patent No.: US 10,371,117 B2
(45) Date of Patent: Aug. 6, 2019

(54) IGNITION APPARATUS FOR INTERNAL COMBUSTION ENGINE

(71) Applicant: DENSO CORPORATION, Kariya, Aichi-pref. (JP)

(72) Inventors: Kenta Kyouda, Kariya (JP); Satoru Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 267 days.

(21) Appl. No.: 15/301,789

(22) PCT Filed: Apr. 7, 2015

(86) PCT No.: PCT/JP2015/060892

§ 371 (c)(1),
(2) Date: Oct. 4, 2016

(87) PCT Pub. No.: WO2015/156297

PCT Pub. Date: Oct. 15, 2015

(65) Prior Publication Data

US 2017/0117078 A1 Apr. 27, 2017

(30) Foreign Application Priority Data

Apr. 10, 2014 (JP) ................................ 2014-080758

(51) Int. Cl.
*F02P 15/10* (2006.01)
*H01F 38/12* (2006.01)
(Continued)

(52) U.S. Cl.
CPC ............. *F02P 15/10* (2013.01); *F02P 3/0442* (2013.01); *F02P 3/0846* (2013.01); *F02P 3/09* (2013.01);
(Continued)

(58) Field of Classification Search
CPC ... H01F 7/064; H01F 38/12; F02P 3/09; F02P 15/10; F02P 5/15; F02P 17/12;
(Continued)

(56) References Cited

U.S. PATENT DOCUMENTS 3,945,362 A * 3/1976 Neuman ............... F02P 3/0453 123/606
4,938,200 A * 7/1990 Iwasaki ................... F02P 3/005 123/606
(Continued)

FOREIGN PATENT DOCUMENTS

JP H02-020466 6/1990
JP 4938404 5/2012
(Continued)

*Primary Examiner* — Sizo B Vilakazi
*Assistant Examiner* — Brian R Kirby
(74) *Attorney, Agent, or Firm* — Nixon & Vanderhye P.C.

(57) ABSTRACT

An ignition apparatus includes a blow-off determining unit. The blow-off determining unit determines, when a secondary electric current drops below a predetermined threshold value Ia during a determination period, that blow-off has occurred; the determination period is a predetermined time period ΔT from the start of a spark discharge by a main ignition circuit. Further, when it is determined that blow-off has occurred during a main ignition (full-transistor ignition), it is controlled to perform a continuing spark discharge after the main ignition in a next cycle. Moreover, a secondary electric current command value I2*a* in performing the continuing spark discharge is set to an electric current value that is obtained by adding a predetermined electric current value α to the predetermined threshold value Ia used in the blow-off determination. Consequently, in the next cycle, it is possible to reliably prevent blow-off, thereby reliably preventing a misfire.

8 Claims, 4 Drawing Sheets

(51) Int. Cl.

| | |
|---|---|
| ***F02P 3/04*** | (2006.01) |
| ***F02P 3/08*** | (2006.01) |
| ***F02P 3/09*** | (2006.01) |
| ***F02P 5/15*** | (2006.01) |
| ***F02P 9/00*** | (2006.01) |
| ***H01F 7/06*** | (2006.01) |
| ***F02P 17/12*** | (2006.01) |

(52) U.S. Cl.
CPC ................. *F02P 5/15* (2013.01); *F02P 9/007* (2013.01); *F02P 17/12* (2013.01); *H01F 38/12* (2013.01); *F02D 2200/101* (2013.01); *F02P 3/0876* (2013.01); *H01F 7/064* (2013.01); *Y02T 10/46* (2013.01)

(58) Field of Classification Search
CPC ........ F02P 3/0442; F02P 9/007; F02P 3/0846; F02P 3/0876; Y02T 10/46; F02D 2200/101
USPC ........................................ 123/406.59, 406.57
See application file for complete search history.

(56) References Cited

U.S. PATENT DOCUMENTS

| | | | | | |
|---|---|---|---|---|---|
| 5,193,514 | A * | 3/1993 | Kobayashi | F02P 3/0552 123/634 |
| 5,964,811 | A * | 10/1999 | Ishii | F02D 41/266 123/479 |
| 6,526,953 | B1 * | 3/2003 | Inagaki | F02P 3/0435 123/609 |
| 9,291,142 | B2 * | 3/2016 | Mori | F02P 17/12 |
| 2003/0084889 | A1 * | 5/2003 | Skinner | F02P 3/02 123/609 |
| 2007/0181110 | A1 * | 8/2007 | Toriyama | F02P 3/0552 123/637 |
| 2011/0144881 | A1 * | 6/2011 | Glugla | F02P 15/08 701/102 |
| 2013/0192570 | A1 * | 8/2013 | Kajita | F02P 15/00 123/596 |
| 2013/0241429 | A1 * | 9/2013 | Ruan | F02P 3/053 315/220 |

FOREIGN PATENT DOCUMENTS

| | | | | |
|---|---|---|---|---|
| JP | 2013024060 | A | * | 2/2013 |
| JP | 2013024060 | A | * | 2/2013 |
| JP | WO/2014/112197 | | * | 7/2014 |

* cited by examiner

IGNITION APPARATUS FOR INTERNAL COMBUSTION ENGINE

CROSS-REFERENCE TO RELATED APPLICATION

This application is the U.S. national phase of International Application No. PCT/JP2015/060892 filed Apr. 7, 2015 which designated the U.S. and claims priority to JP Patent Application No. 2014-080758 filed Apr. 10, 2014, the entire contents of each of which are hereby incorporated by reference.

TECHNICAL FIELD

The present invention relates to ignition apparatuses for use in internal combustion engines, and more particularly to techniques for continuing a spark discharge.

BACKGROUND ART

As a technique for reducing the burden due to the repetition of blow-off and re-discharge of an ignition plug, suppressing unnecessary electric power consumption and continuing a spark discharge, the present applicant has devised an energy input circuit (not a publicly known art). The energy input circuit inputs electrical energy, after the start of an initial spark discharge (to be referred to as main ignition) by a well-known ignition circuit, to a battery voltage supply line from a low-voltage side of a primary coil before the main ignition is blown off; with the electrical energy input, the energy input circuit continuously applies electric current in the same direction to a secondary coil (DC secondary electric current), thereby continuing the spark discharge caused by the main ignition for an arbitrary time period (hereinafter, discharge continuation period). In addition, hereinafter, the spark discharge continued by the energy input circuit (the spark discharge following the main ignition) will be referred to as continuing spark discharge.

The energy input circuit controls, by controlling a primary electric current (input energy) in the discharge continuation period, the secondary electric current to sustain the spark discharge. By controlling the secondary electric current in the continuing spark discharge, it is possible to prevent blow-off of the ignition plug, reduce the burden of wear of electrodes, suppress unnecessary electric power consumption and continue the spark discharge.

Moreover, since the secondary electric current is applied in the same direction in the continuing spark discharge following the main ignition, it is difficult for the spark discharge to be interrupted in the continuing spark discharge following the main ignition. Therefore, with employment of the continuing spark discharge by the energy input, it is possible to prevent blow-off of the spark discharge even in an operating condition which is lean burn and in which a rotational flow is created in the cylinder.

Next, for the purpose of assisting the understanding of the present invention, a typical example of the energy input circuit (as described above, not a publicly known art), to which the present invention is not applied, will be described based on FIGS. 5-7. In addition, in FIG. 5, functional components identical to those in embodiments which will be described later are given the same reference signs as in the embodiments.

An ignition apparatus as shown in FIG. 5 includes a main ignition circuit 3 that causes the main ignition in a spark plug 1 by a full-transistor operation (on/off operation of an ignition switching means 13) and the energy input circuit 4 that performs the continuing spark discharge following the main ignition.

The energy input circuit 4 is configured with a boosting circuit 18 that boosts the voltage of an in-vehicle battery 11 (DC power source), an energy input switching means 27 for controlling the electrical energy inputted to the low-voltage side of the primary coil 7, and an energy input driver circuit 28 that controls the on/off operation of the energy input switching means 27.

FIG. 6 shows time charts illustrating the operation of the ignition apparatus in causing the main ignition.

The main ignition circuit 3 operates based on an ignition signal IGT provided by an ECU 5 (abbreviation of Engine Control Unit). Upon the ignition signal IGT being switched from low to high, the primary coil 7 of the ignition coil 2 is energized. Then, when the ignition signal IGT is switched from high to low and thus the energization of the primary coil 7 is interrupted, a high voltage is generated in the secondary coil 8 of the ignition coil 2, starting the main ignition in the ignition plug.

After the start of the main ignition in the ignition plug 1, the secondary electric current attenuates substantially in the shape of a sawtooth wave (see FIG. 6). In addition, in the time chart of the secondary electric current, the electric current value increases in the direction toward the negative side (downward in the figure).

FIG. 7 shows time charts illustrating the operation of the ignition apparatus in performing the continuing spark discharge after the main ignition.

The energy input circuit 4 operates based on a discharge continuation signal IGW and a secondary electric current command signal IGA provided by the ECU 5; the secondary electric current command signal IGA indicates a secondary electric current command value I2*a*.

After the main ignition, for inputting energy to the secondary coil 8 before the secondary electric current drops to a "predetermined lower limit electric current value" (electric current value for sustaining the spark discharge) and thereby sustaining the spark discharge, the ECU 5 outputs both the discharge continuation signal IGW and the secondary electric current command signal IGA to the energy input circuit 4.

Upon the discharge continuation signal IGW being switched from low to high, the input of electrical energy from the low-voltage side of the primary coil 7 to the positive side is started. Specifically, during a time period in which IGW is high, by on/off controlling the energy input switching means 27, the secondary electric current is controlled so as to be kept at the secondary electric current command value I2*a* (see FIG. 7).

(Problematic Issue)

With employment of the continuing spark discharge by the energy input, it becomes difficult for blow-off of a spark discharge to occur even in an operating condition which is lean burn and in which a rotational flow is created in the cylinder.

In the ignition apparatus that is capable of performing the continuing spark discharge by the energy input, there are cases where only the main ignition is performed in an operating condition in which it is relatively difficult for blow-off to occur. That is, there are cases where: a predetermined operating condition, which is set according to the engine rotational speed, the engine load and the like, is defined as a main ignition region; and in the main ignition region, only the main ignition is performed. However, even in the region which is set as the operating condition where it is difficult for blow-off to occur, there is still a risk of blow-off occurring during the main ignition due to differences between individual engines, variation among cylinders and age deterioration.

Therefore, even in the ignition apparatus that is capable of performing the continuing spark discharge by the energy input, it is still necessary to take measures to determine blow-off in the main ignition region and thereby prevent a misfire.

In addition, as a technique for preventing blow-off in an ignition apparatus, there is disclosed in Patent Document 1 a technique of switching from a lean operation to a stoichiometric operation when it is impossible to secure a discharge time longer than or equal to a predetermined time. However, even in the stoichiometric operation, there are still cases where it is impossible to secure the discharge time due to differences between individual engines, variation among cylinders and age deterioration. Therefore, even if switched to the stoichiometric operation, there is still a risk that blow-off may occur, thereby resulting in a misfire.

Moreover, in Patent Document 2, there is disclosed detection of blow-off. However, according to the technique of Patent Document 2, a discharge is inhibited upon detection of blow-off. Therefore, there is a risk of resulting in a misfire.

PRIOR ART LITERATURE

Patent Literature

[PATENT DOCUMENT 1] Japanese Patent No. JP4938404B2

[PATENT DOCUMENT 2] Japanese Patent Application Publication No. JP2013100811A

SUMMARY OF THE INVENTION

Problems to be Solved by the Invention

The present invention has been made in view of the above problems. An object of the present invention is to detect, in an ignition apparatus for an internal combustion engine which is capable of performing a continuing spark discharge by an energy input, occurrence of blow-off in a main ignition region and thereby reliably prevent a misfire.

Means for Solving the Problems

An ignition apparatus for an internal combustion engine according to the present invention includes a main ignition circuit, an energy input circuit and a blow-off determining unit.

The main ignition circuit performs an energization control of a primary coil of an ignition coil, thereby causing a spark discharge in an ignition plug.

The energy input circuit inputs electrical energy to the primary coil during the spark discharge started by operation of the main ignition circuit, thereby applying a secondary electric current in the same direction to a secondary coil of the ignition coil. The energy input circuit also keeps the secondary electric current at a secondary electric current command value, thereby continuing the spark discharge started by operation of the main ignition circuit.

The blow-off determining unit determines, when the secondary electric current drops below a predetermined threshold value Ia during a determination period, that blow-off has occurred; the determination period is a time period from the start of the spark discharge by the main ignition circuit until the elapse of a predetermined time ΔT.

Further, in the ignition apparatus for an internal combustion engine according to the present invention, when it is determined that blow-off has occurred during the main ignition, the continuing spark discharge is performed in a next cycle.

According to the present invention, when it is determined that blow-off has occurred during the main ignition (e.g., full-transistor ignition), it is controlled to perform the continuing spark discharge after the main ignition in the next cycle. Moreover, the secondary electric current command value in performing the continuing spark discharge is set to an electric current value that is obtained by adding a margin (+α) to the threshold electric current value used in the blow-off determination.

Consequently, in the next cycle, it is possible to reliably prevent blow-off, thereby reliably preventing a misfire.

EMBODIMENTS FOR CARRYING OUT THE INVENTION

Hereinafter, embodiments of the present invention will be described with reference to the drawings.

In addition, each of the following embodiments discloses one specific example, and it goes without saying that the present invention is not limited to the following embodiments.

First Embodiment

Figure 1:
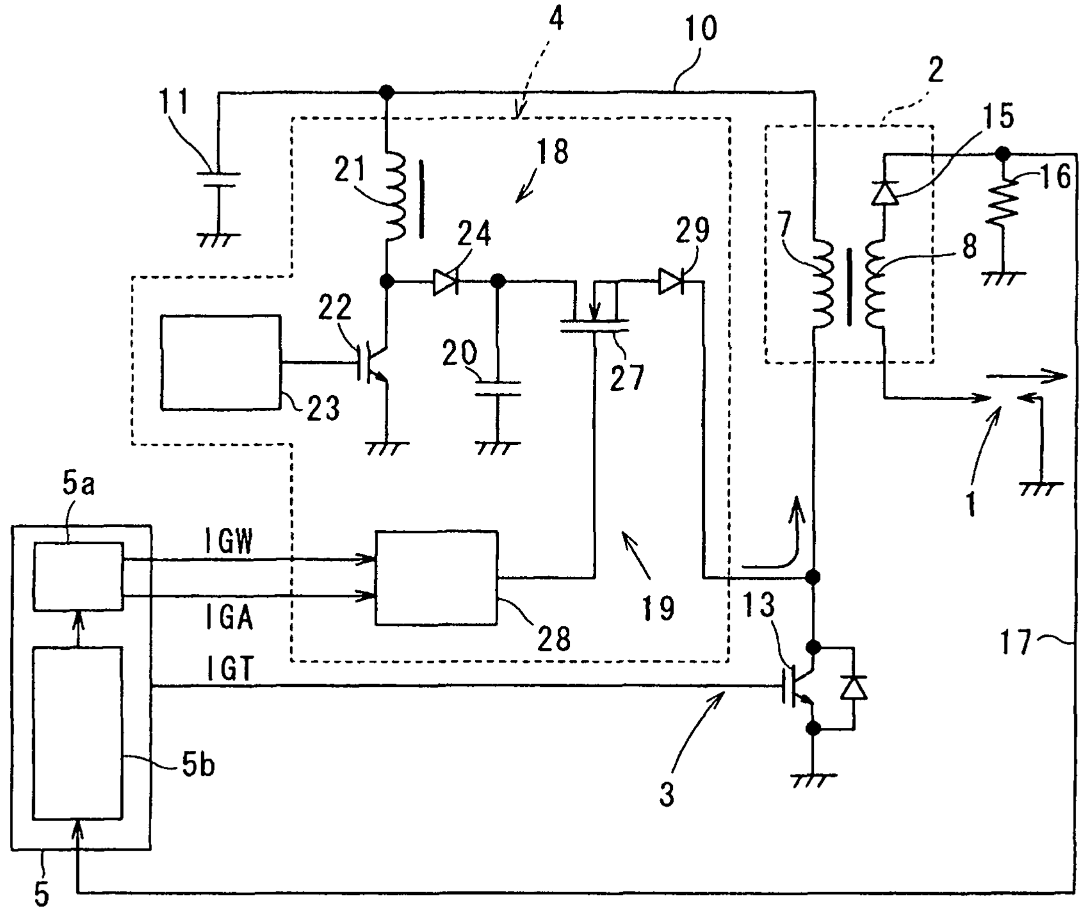
FIG. 1 is a schematic configuration diagram of an ignition apparatus for an internal combustion engine (a first embodiment).

A first embodiment will be described with reference to FIGS. 1-3. An ignition apparatus in the first embodiment is designed to be mounted to a spark ignition engine for vehicle driving and ignite an air-fuel mixture in a combustion chamber at predetermined ignition timing. In addition, an example of the engine is a direct injection engine which uses gasoline as fuel and is capable of lean burn. The engine includes a rotational flow control means for creating a rotational flow (tumble flow or swirl flow) of the air-fuel mixture in the cylinder.

The ignition apparatus in the first embodiment is of a DI (Direct Ignition) type which uses a corresponding ignition coil 2 for an ignition plug 1 of each cylinder.

The ignition apparatus includes the ignition plug 1, the ignition coil 2, a main ignition circuit 3, an energy input circuit 4 and an ECU 5.

The main ignition circuit 3 and the energy input circuit 4 control energization of a primary coil 7 of the ignition coil 2 based on command signals provided by the ECU 5. Further, by controlling energization of the primary coil 7, these circuits 3 and 4 also control electrical energy generated in a secondary coil 8 of the ignition coil 2, thereby controlling a spark discharge of the ignition plug 1.

In addition, the ECU 5 generates and outputs an ignition signal IGT, a discharge continuation signal IGW and a secondary electric current command signal IGA according to engine parameters (warm-up state, engine rotational speed, engine load and the like) acquired from various sensors and the engine control state (the presence or absence of lean burn, the degree of a rotational flow and the like).

That is, the ECU 5 includes a main ignition commanding unit (not shown) that generates and sends to the main ignition circuit 3 the ignition signal IGT and an energy input commanding unit 5*a* that generates and sends to the energy input circuit 4 both the discharge continuation signal IGW and the secondary electric current command signal IGA.

The ignition plug 1 is of a well-known type. The ignition plug 1 includes a center electrode that is connected with one end of the secondary coil 8 of the ignition coil 2 via an output terminal and an outer electrode that is earth grounded via a cylinder head of the engine or the like. The spark discharge is caused between the center electrode and the outer electrode by the electrical energy generated in the secondary coil 8. The ignition plug 1 is mounted to each cylinder.

The ignition coil 2 includes the primary coil 7 and the secondary coil 8 that has a greater number of turns than the primary coil 7.

One end of the primary coil 7 is connected with a positive terminal of the ignition coil 2. The positive terminal is connected to a battery voltage supply line 10 (a line receiving the supply of electric power from a positive electrode of an in-vehicle battery 11).

The other end of the primary coil 7 is connected with a ground-side terminal of the ignition coil 2. The ground-side terminal is earth grounded via an ignition switching means 13 (power transistor, MOS transistor or the like) of the main ignition circuit 3.

One end of the secondary coil 8 is connected with the output terminal as described above. The output terminal is connected with the center electrode of the ignition plug 1.

The other end of the secondary coil 8 is earth grounded via a first diode 15 and an electric current detection resistor 16. The first diode 15 limits the flow direction of electric current flowing in the secondary coil 8 to one direction. The electric current detection resistor 16 functions as detection means for detecting the secondary electric current.

In the present embodiment, the electric current detection resistor 16 is connected with the ECU 5 via a detection line 17, so that a detection value of the secondary electric current is inputted to the ECU 5.

The main ignition circuit 3 is a circuit which performs an energization control of the primary coil 7 of the ignition coil 2, thereby causing a spark discharge in the ignition plug 1.

The main ignition circuit 3 applies the voltage of the in-vehicle battery 11 (battery voltage) to the primary coil 7 for a time period in which the ignition signal IGT is provided. Specifically, the main ignition circuit 3 includes the ignition switching means 13 (power transistor or the like) for switching on/off the energization state of the primary coil 7. Upon provision of the ignition signal IGT, the ignition switching means 13 is turned on, thereby applying the battery voltage to the primary coil 7.

The ignition signal IGT is a signal which commands a time period in which magnetic energy is to be stored in the primary coil 7 in the main ignition circuit 3 (energy storage time) and a discharge start timing.

The energy input circuit 4 is a circuit which inputs electrical energy to the primary coil 7 during a spark discharge started by operation of the main ignition circuit 3, thereby applying the secondary electric current in the same direction to the secondary coil 8 to continue the spark discharge started by operation of the main ignition circuit 3.

The energy input circuit 4 is configured with a boosting circuit 18 and an input energy control means 19.

The boosting circuit 18 boosts, during the time period in which the ignition signal IGT is provided by the ECU 5, the voltage of the in-vehicle battery 11 and stores it in a capacitor 20.

The input energy control means 19 inputs the electrical energy stored in the capacitor 20 to the negative side (the ground side) of the primary coil 7.

The boosting circuit 18 is configured to include, in addition to the capacitor 20, a choke coil 21, a boosting switching means 22, a boosting driver circuit 23 and a second diode 24. In addition, the boosting switching means 22 is, for example, a MOS transistor.

The choke coil 21 has one end connected to the positive electrode of the in-vehicle battery 11. The energization state of the choke coil 21 is switched on/off by the boosting switching means 22. Moreover, the boosting driver circuit 23 provides a control signal to the boosting switching means 22, thereby turning on/off the boosting switching means 22. With the on/off operation of the boosting switching means 22, the magnetic energy stored in the choke coil 21 is charged as electrical energy into the capacitor 20.

In addition, the boosting driver circuit 23 is provided to repeatedly turn on/off the boosting switching means 22 in a predetermined cycle during the time period in which the ignition signal IGT is kept on by the ECU 5. Moreover, the second diode 24 is provided to prevent the electrical energy stored in the capacitor 20 from flowing back to the choke coil 21 side.

The input energy control means 19 is configured with an energy input switching means 27, an energy input driver circuit 28 and a third diode 29. In addition, the energy input switching means 27 is, for example, a MOS transistor.

The energy input switching means 27 is provided to switch on/off the input of the electrical energy stored in the capacitor 20 to the primary coil 7 from the negative side (the low-voltage side). The energy input driver circuit 28 provides a control signal to the energy input switching means 27, thereby turning on/off the energy input switching means 27.

Further, by turning on/off the energy input switching means 27, the energy input driver circuit 28 controls the electrical energy inputted from the capacitor 20 to the primary coil 7, thereby keeping the secondary electric current at a secondary electric current command value I2*a* for the time period in which the discharge continuation signal IGW is provided.

The discharge continuation signal IGW is a signal which commands an energy input timing and a time period in which the continuing spark discharge is to be continued.

More specifically, the discharge continuation signal IGW commands a time period in which the energy input switching means 27 is to be repeatedly turned on/off, thereby inputting electrical energy from the boosting circuit 18 to the primary coil 7 (energy input time). In addition, the third diode 29 is provided to prevent electric current from flowing from the primary coil 7 back to the capacitor 20.

A specific example of the energy input driver circuit 28 is a circuit which on/off controls the energy input switching means 27 by an open-loop control (feed-forward control), so as to keep the secondary electric current at the secondary electric current command value I2*a*.

Alternatively, the energy input driver circuit 28 may be a circuit which feedback controls the on/off state of the energy input switching means 27, so as to keep the detection value of the secondary electric current detected by the electric current detection resistor 16 at the secondary electric current command value I2*a*. In this case, a feedback circuit is provided such that: the circuit is connected with the detection line 17 and the detection value of the secondary electric current is inputted to the circuit; and the circuit produces and outputs a feedback value for controlling the energy input switching means 27 on the basis of the detection value of the secondary electric current and the secondary electric current command value I2*a*.

Moreover, the secondary electric current command value I2*a* is set in the ECU 5 and sent, as the secondary electric current command signal IGA, to the energy input driver circuit 28.

Features of First Embodiment

The ignition apparatus includes a blow-off determining unit 5*b*. The blow-off determining unit 5*b* determines, when the secondary electric current drops below a predetermined threshold value Ia during a determination period, that blow-off has occurred; the determination period is a predetermined time period ΔT from the start of a spark discharge by the main ignition circuit 3. The blow-off determining unit 5*b* is provided in the ECU 5.

Moreover, based on the determination result from the blow-off determining unit 5*b*, the energy input commanding unit 5*a* generates and sends to the energy input circuit 4 both the discharge continuation signal IGW and the secondary electric current command signal IGA.

Specifically, when it is determined that blow-off has occurred during the main ignition, the energy input commanding unit 5*a* generates the discharge continuation signal IGW so as to perform the continuing spark discharge in the next cycle (during the next ignition); at the same time, the energy input commanding unit 5*a* sets an electric current value that is obtained by adding a predetermined electric current value α to the predetermined threshold value Ia as the secondary electric current command value I2*a* in the continuing spark discharge in the next cycle.

Figure 2:
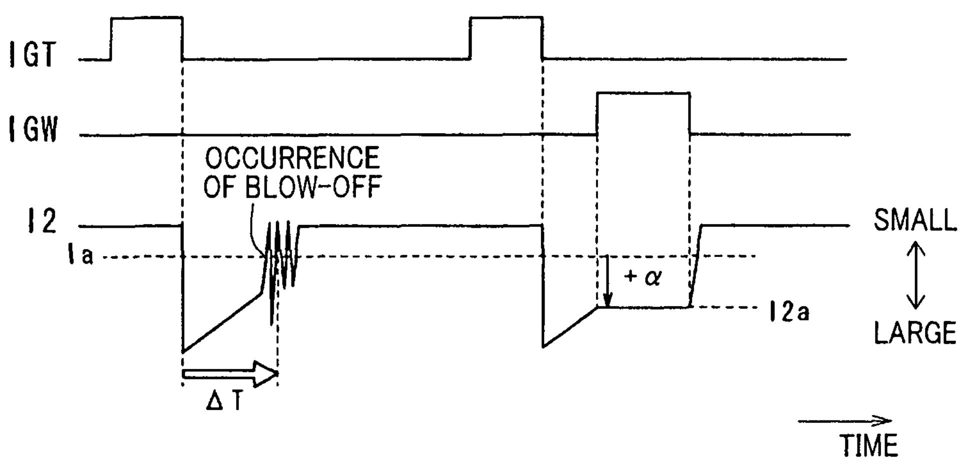
FIG. 2 shows time charts illustrating the operation and blow-off determination of the ignition apparatus for an internal combustion engine (the first embodiment).
Figure 3:
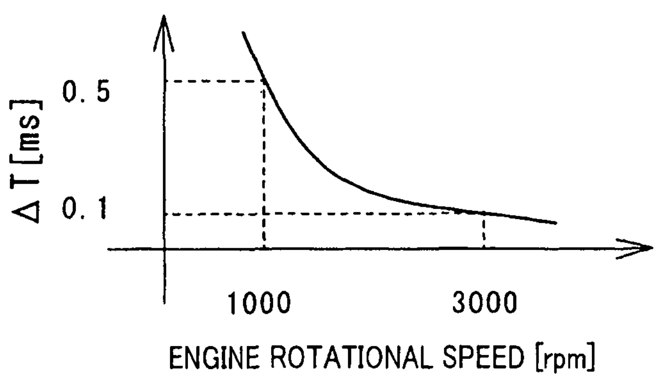
FIG. 3 is a correlation diagram illustrating the relationship between engine rotational speed and determination period (the first embodiment).

Referring to FIG. 2, the operation and blow-off determination of the ignition apparatus will be described in more detail. In addition, in the time chart of the secondary electric current, the electric current value increases in the direction toward the negative side.

In the present embodiment, for example, in a predetermined operating condition, the discharge continuation signal IGW after the initial ignition signal IGT is low-outputted so as to perform only the main ignition without performing the continuing spark discharge.

Figure 6:
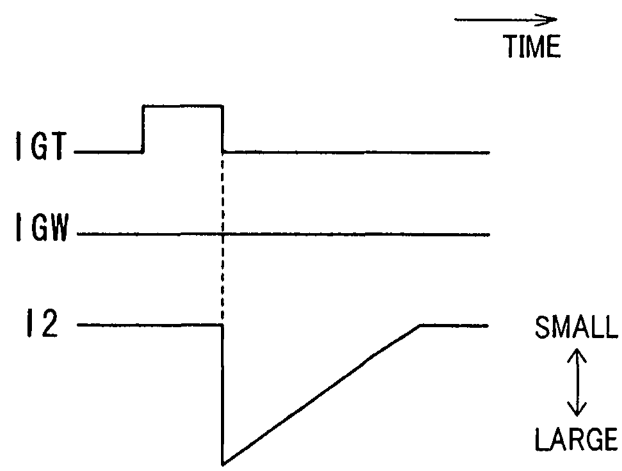
FIG. 6 shows time charts illustrating operation of the ignition apparatus for an internal combustion engine (the investigative example: not a publicly known art).
Figure 7:
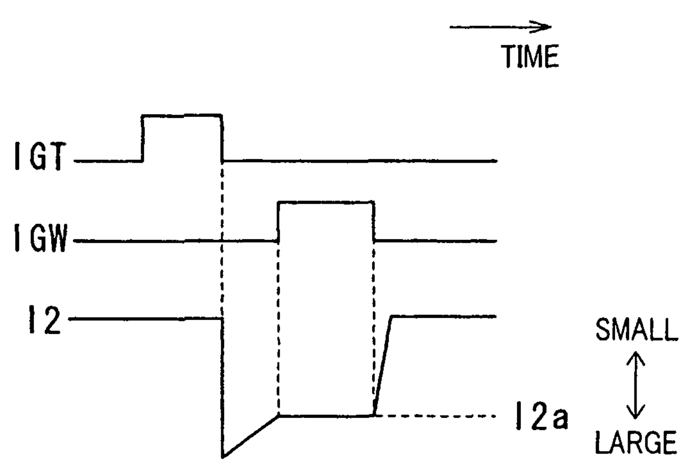
FIG. 7 shows time charts illustrating the operation of the ignition apparatus for an internal combustion engine (the investigative example: not a publicly known art).

To the blow-off determining unit 5*b*, there is inputted the detection value of the secondary electric current detected by the electric current detection resistor 16. When the detection value of the secondary electric current drops below the predetermined threshold value Ia during the predetermined time period ΔT (hereinafter, to be referred to as determination period ΔT) from the start of a spark discharge by the main ignition circuit 3 (i.e., from the falling of the ignition signal IGT), the blow-off determining unit 5*b* determines that blow-off has occurred. In addition, when no blow-off has occurred during the attenuation of the secondary electric current in the main ignition, the secondary electric current attenuates substantially linearly as shown in FIG. 6.

The determination period ΔT is set such that the higher the engine rotational speed, the shorter the determination period ΔT. For example, the determination period ΔT is set based on a map as shown in FIG. 3.

Further, when it is determined that blow-off has occurred during the main ignition, the energy input commanding unit 5*a* high-outputs the discharge continuation signal IGW after the ignition signal in the next cycle, thereby commanding the energy input circuit 4 to perform the continuing spark discharge.

Moreover, the energy input commanding unit 5*a* sets the electric current value that is obtained by adding the predetermined electric current value α to the predetermined threshold value Ia as the secondary electric current command value I2*a* in performing the continuing spark discharge in the next cycle; then the energy input commanding unit 5*a* generates and sends to the energy input circuit 4 the secondary electric current command signal IGA. In addition, the electric current value α increases with the engine rotational speed.

Advantageous Effects of First Embodiment

The ignition apparatus of the first embodiment includes the blow-off determining unit 5*b*. The blow-off determining unit 5*b* determines, when the secondary electric current drops below the predetermined threshold value Ia during the determination period, that blow-off has occurred; the determination period is a predetermined time period ΔT from the start of a spark discharge by the main ignition circuit 3. Further, when it is determined that blow-off has occurred during the main ignition (full-transistor ignition), it is controlled to perform the continuing spark discharge after the main ignition in the next cycle. Moreover, the secondary electric current command value in performing the continuing spark discharge is set to an electric current value that is obtained by adding the predetermined electric current value α to the predetermined threshold value Ia.

Consequently, in the next cycle, it is possible to reliably prevent blow-off, thereby reliably preventing a misfire.

Moreover, there are cases where blow-off occurs in a main ignition region due to differences between individual engines, variation among cylinders and age deterioration. In these cases, it is possible to detect the blow-off in the main ignition region and automatically employ the continuing spark discharge, thereby keeping each individual engine in an optimal state.

In addition, the main ignition region is a predetermined region of operating conditions which is set, according to the engine rotational speed, the engine load or the like, as a region where it is difficult for blow-off to occur when only the main ignition is performed and thus where only the main ignition is performed.

Moreover, the electric current value α is set such that the higher the engine rotational speed, the greater the electric current value α.

When the engine rotational speed is low, the flow speed of gas flow around the ignition plug 1 is also low; therefore, even if the electric current value $\alpha$ is small, it is still possible to sufficiently prevent blow-off in the next cycle. In contrast, when the engine rotational speed is high, the flow speed of gas flow around the ignition plug 1 is also high; therefore, to reliably prevent blow-off, it is necessary to increase the electric current value $\alpha$.

Accordingly, by setting the electric current value $\alpha$ so as to increase with the engine rotational speed, it is possible to suppress unnecessary energy consumption in a low rotational speed region while reliably preventing blow-off in a high rotational speed region.

Second Embodiment

A second embodiment will be described with reference to FIG. 4. In addition, in the second embodiment, reference signs the same as those in the first embodiment designate functional components identical to those in the first embodiment.

In an ignition apparatus of the present embodiment, when it is determined that blow-off has occurred during the continuing spark discharge, the energy input commanding unit 5*a* generates the discharge continuation signal IGW so as to perform the continuing spark discharge in the next cycle as well; at the same time, the energy input commanding unit 5*a* sets an electric current value that is obtained by adding a predetermined electric current value $\alpha'$ to the predetermined threshold value Ia as the secondary electric current command value in the continuing spark discharge in the next cycle.

That is, when it is further determined that blow-off has occurred in a cycle where the continuing spark discharge has already been employed upon the determination of blow-off in the main ignition, it is controlled to perform the continuing spark discharge in the next cycle as well. Moreover, the secondary electric current command value I2*a* in performing the continuing spark discharge in the next cycle is set to the electric current value that is obtained by adding the predetermined electric current value $\alpha'$ to the predetermined threshold value Ia used for the blow-off determination.

Figure 4:
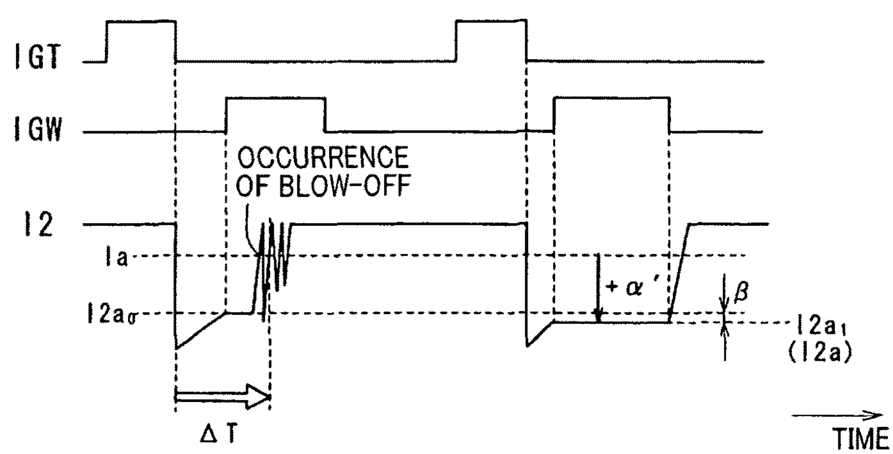
FIG. 4 shows time charts illustrating the operation and blow-off determination of an ignition apparatus for an internal combustion engine (a second embodiment).
Figure 5:
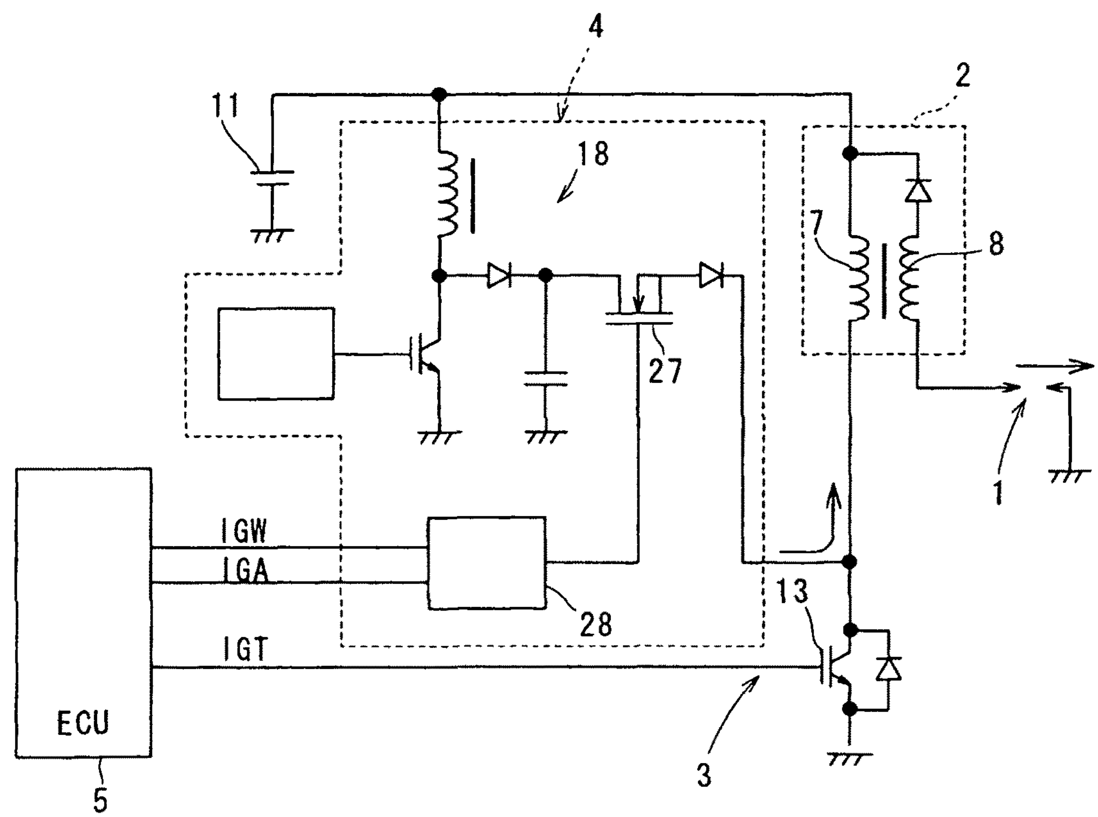
FIG. 5 is a schematic configuration diagram of an ignition apparatus for an internal combustion engine (an investigative example: not a publicly known art).

In addition, as shown in FIG. 4, let $I2a_0$ be the secondary electric current command value in the cycle where it is determined that blow-off has occurred, and $I2a_1$ be the secondary electric current command value in the next cycle. Then, the secondary electric current command value $I2a_1$ may be commanded as an electric current value that is obtained by adding an electric current value $\beta$ to the secondary electric current command value $I2a_0$. The electric current value $\beta$ is such a value that satisfies: $Ia+\alpha'=I2a_0+\beta$.

Moreover, the secondary electric current command value $I2a_1$ in the next cycle may be a preset value. That is, a large electric current value, to be employed as the secondary electric current command value when it is determined that blow-off has occurred, may be kept in advance as the preset value.

In the present embodiment, it is also possible to reliably prevent blow-off in the next cycle, thereby reliably preventing a misfire.

INDUSTRIAL APPLICABILITY

In the above-described embodiments, examples are shown where the ignition apparatuses of the present invention are used in a gasoline engine. However, since the ignitability of fuel (more specifically, air-fuel mixture) can be improved by the continuing spark discharge, an ignition apparatus of the present invention may also be applied to engines that use ethanol fuel or blend fuel. As a matter of course, even if an ignition apparatus of the present invention is applied to an engine in which low-grade fuel may be used, it is still possible to improve the ignitability by the continuing spark discharge.

In the above-described embodiments, examples are shown where the ignition apparatuses of the present invention are used in an engine capable of lean burn operation. However, since it is possible to improve the ignitability by the continuing spark discharge in a combustion state different from lean burn, the application of an ignition apparatus of the present invention is not limited to a lean burn engine; instead, an ignition apparatus of the present invention may also be applied to an engine that does not perform lean burn.

In the above-described embodiments, examples are shown where the ignition apparatuses of the present invention are used in a direct injection engine that injects fuel directly into a combustion chamber. However, an ignition apparatus of the present invention may also be applied to a port injection engine that injects fuel to the intake upstream side of an intake valve (into an intake port).

In the above-described embodiments, examples are shown where the ignition apparatuses of the present invention are used in an engine that actively creates a rotational flow (tumble flow or swirl flow) of the air-fuel mixture in a cylinder. However, an ignition apparatus of the present invention may also be applied to an engine that does not have any rotational flow control means (tumble flow control valve or swirl flow control valve).

In the above-described embodiments, the present invention is applied to DI-type ignition apparatuses. However, the present invention may also be applied to a distributor-type ignition apparatus that distributes the secondary voltage to each ignition plug 1 or to an ignition apparatus of a single-cylinder engine (e.g., a motorcycle or the like) where it is unnecessary to distribute the secondary voltage.

DESCRIPTION OF REFERENCE SIGNS

1: ignition plug
2: ignition coil
3: main ignition circuit
4: energy input circuit
5: ECU
5*a*: energy input commanding unit
5*b*: blow-off determining unit
7: primary coil
8: secondary coil

The invention claimed is:

1. An ignition apparatus for an internal combustion engine, the ignition apparatus comprising: a main ignition circuit configured to perform an energization control of a primary coil of an ignition coil, thereby causing a spark discharge in an ignition plug; an energy input circuit configured to selectively input electrical energy to the primary coil during the spark discharge started by operation of the main ignition circuit, thereby applying a secondary electric current in the same direction to a secondary coil of the ignition coil, the energy input circuit also configured to keep the secondary electric current at a secondary electric current command value, thereby continuing the spark discharge started by operation of the main ignition circuit; and an engine control unit (ECU) configured to: determine, when the secondary electric current drops below a predetermined threshold value during a determination period, that blow-off has occurred, the determination period being a predetermined time period ΔT from the start of the spark discharge by the main ignition circuit; and control electrical energy to be inputted by the energy input circuit to the primary coil during the spark discharge started by operation of the main ignition circuit in a next cycle when it is determined, based on a determination result of the engine control unit (ECU), that blow-off has occurred during the spark discharge by the main ignition circuit.

2. The ignition apparatus for an internal combustion engine as set forth in claim 1, wherein the engine control unit (ECU) is further configured to:

obtain the secondary electric current command value, which is an electric current value, in the energy input by the energy input circuit in the next cycle by adding a predetermined electric current value to the predetermined threshold value, when it is determined that blow-off has occurred during the spark discharge by the main ignition circuit.

3. The ignition apparatus for an internal combustion engine as set forth in claim 1, wherein the engine control unit (ECU) is further configured to:

upon a determination that blow-off has occurred during a continuing spark discharge which is the spark discharge continued by the energy input by the energy input circuit in the cycle after the determination of occurrence of blow-off during the spark discharge by the main ignition circuit, in a next cycle to the cycle, perform the energy input by the energy input circuit with the secondary electric current command value set to an electric current value that is obtained by adding a predetermined electric current value to the predetermined threshold value Ia.

4. The ignition apparatus for an internal combustion engine as set forth in claim 2, wherein the engine control unit (ECU) is further configured to set the predetermined electric current value such that the higher the engine rotational speed, the greater the predetermined electric current value.

5. A method of operating an ignition apparatus for an internal combustion engine, the method comprising: performing, using a main ignition circuit, an energization control of a primary coil of an ignition coil, thereby causing a spark discharge in an ignition plug; selectively inputting electrical energy, using an energy input circuit, to the primary coil during the spark discharge started by operation of the main ignition circuit, thereby applying a secondary electric current in the same direction to a secondary coil of the ignition coil, keeping, using the energy input circuit, the secondary electric current at a secondary electric current command value, thereby continuing the spark discharge started by operation of the main ignition circuit; determining, when the secondary electric current drops below a predetermined threshold value during a determination period, that blow-off has occurred, the determination period being a predetermined time period ΔT from the start of the spark discharge by the main ignition circuit; and controlling electrical energy to be inputted by the energy input circuit to the primary coil during the spark discharge started by operation of the main ignition circuit in a next cycle when it is determined, based on a determination result, that blow-off has occurred during the spark discharge by the main ignition circuit.

6. The method of claim 5, further comprising:

obtaining the secondary electric current command value, which is an electric current value, in the energy input by the energy input circuit in the next cycle by adding a predetermined electric current value to the predetermined threshold value when it is determined that blow-off has occurred during the spark discharge by the main ignition circuit.

7. The method as set forth in claim 5, further comprising:

upon a determination that blow-off has occurred during a continuing spark discharge which is the spark discharge continued by the energy input by the energy input circuit in the cycle after the determination of occurrence of blow-off during the spark discharge by the main ignition circuit, in a next cycle to the cycle, performing the energy input by the energy input circuit with the secondary electric current command value set to an electric current value that is obtained by adding a predetermined electric current value to the predetermined threshold value.

8. The method as set forth in claim 6, further comprising:

setting the predetermined electric current value such that the higher the engine rotational speed, the greater the predetermined electric current value.

* * * * *